United States Patent
Perez et al.

(10) Patent No.: US 11,934,782 B2
(45) Date of Patent: Mar. 19, 2024

(54) NEURAL REASONING PATH RETRIEVAL FOR MULTI-HOP TEXT COMPREHENSION

(71) Applicant: NAVER CORPORATION, Gyeonggi-do (KR)

(72) Inventors: Julien Perez, Grenoble (FR); Arnaud Sors, Grenoble (FR)

(73) Assignee: NAVER CORPORATION, Gyeonggi-Do (KR)

( * ) Notice: Subject to any disclaimer, the term of this patent is extended or adjusted under 35 U.S.C. 154(b) by 329 days.

(21) Appl. No.: 17/506,917

(22) Filed: Oct. 21, 2021

(65) Prior Publication Data
US 2022/0222436 A1    Jul. 14, 2022

(30) Foreign Application Priority Data
Jan. 14, 2021    (EP) .................................... 21305037

(51) Int. Cl.
G06F 40/284     (2020.01)
G06F 16/93      (2019.01)
G06N 3/04       (2023.01)

(52) U.S. Cl.
CPC ............. *G06F 40/284* (2020.01); *G06N 3/04* (2013.01); *G06F 16/93* (2019.01)

(58) Field of Classification Search
CPC .... G06F 40/284; G06F 16/93; G06F 16/2455; G06F 16/24578; G06F 40/35; G06N 3/08;
(Continued)

(56) References Cited

U.S. PATENT DOCUMENTS 10,452,978 B2    10/2019  Shazeer et al.
10,540,967 B2    1/2020   Perez
(Continued)

FOREIGN PATENT DOCUMENTS

CN    113761936 A    * 12/2021

OTHER PUBLICATIONS

Yixin Nie et al: "Revealing the importance of semantic retrieval for machine reading at scale", in EMNLP, 2019.
(Continued)

*Primary Examiner* — Yogeshkumar Patel

(57) ABSTRACT

A question answering system includes: a neural network tokenizer module configured to determine a token representation of a question to be answered and token representations of candidate paragraphs of a present reasoning path for the question, respectively; a neural network module configured to: transform the token representation of the question and the token representations of the candidate paragraphs of the present reasoning path into vector representations; and append a first variable to the vector representations to produce a second variable; a search module configured to: select the candidate paragraphs from a knowledge database to extend a present reasoning path based on lexical relevance of the candidate paragraphs to the question; and selectively add ones of the candidate paragraphs to the present reasoning path; and an answer inference network module configured to selectively determine an answer to the question based on multiple different portions of the present reasoning path.

22 Claims, 7 Drawing Sheets

P1: Lit (band)
Lit is an American rock band, formed in 1995 in Fullerton, California

P2: Adorable (band)
Adorable was an alternative rock band, formed in Coventry in 1990

Q: Which band was formed first, Lit or Adorable? A: Adorable

P1: Apratim Majumdar
Apratim Majumdar (born 1978), is an Indian classical musician from Kolkata, India. He play the Sarod.

P2: Sarod
The sarod is a stringed instrument of India, used mainly in Indian classical music.

Q: Which class of instrument does Apratim Majumdar play? A: A stringed instrument

(58) Field of Classification Search
CPC ............ G06N 3/04; G06N 3/045; G06N 5/01; G06N 7/01; G06N 3/042; G06N 3/044; G06N 5/022

See application file for complete search history.

(56) References Cited

U.S. PATENT DOCUMENTS

| | | | | |
|---|---|---|---|---|
| 2017/0109355 | A1* | 4/2017 | Li | G06N 7/01 |
| 2018/0137854 | A1* | 5/2018 | Perez | G06F 40/35 |
| 2020/0410012 | A1* | 12/2020 | Moon | G06Q 10/04 |

OTHER PUBLICATIONS

Akari Asai et al.: "*Learning to Retrieve Reasoning Paths over Wikipedia Graph for Question Answering*", arXiv 1911.10470, Feb. 14, 2020.

Ameya Godbole et al: "*Multi-step entity-centric information retrieval for multi-hop question answering*", Proceedings of the 2nd Workshop on Machine Reading for Question Answering, Nov. 4, 2019.

Ankit Chadha and Rewa Sood: "*BERTQA—Attention on Steroids*", arXiv: 1912.10435, Dec. 14, 2019.

Ashish Vaswani et al: "*Attention is all you need*", in Advances in neural information processing systems, Jun. 12, 2017.

Danqi Chen et al: "*Reading Wikipedia to answer open-domain questions*", in ACL, Jul. 30-Aug. 4, 2017.

European Search Report for European Application No. 21 30 5037 dated Jul. 2, 2021.

Grail Quentin: "Latent Question Reformulation and Information Accumulation For Multi-Hop Machine Reading", XP055819663, Sep. 25, 2019.

Jacob Devlin et al., BERT: Pre-training of Deep Bidirectional Transformers for Language Understanding:, XP055723406, May 24, 2019.

Jinhyuk Lee et al: "*Ranking paragraphs for improving answer recall in open-domain question answering*", in: EMNLP, Oct. 1, 2018.

Kenton Lee et al: "*Latent retrieval for weakly supervised open domain question answering*", in ACL, Jun. 27, 2019.

Ming Ding et al: "*Cognitive graph for multi-hop reading comprehension at scale*", in ACL, Jun. 4, 2019.

Minjoon Seo et al: "*Real-time open-domain question answering with dense-sparse phrase index*", in ACL, Jun. 14, 2019.

Peng Qi et al: "*Answering complex open-domain questions through iterative query generation*", in EMNLP, Oct. 15, 2019.

Rajarshi Das et al: "*Multi-step retriever-reader interaction for scalable open-domain question answering*", in ICLR, May 14, 2019.

Shuohang Wang et al: "*R3: Reinforced ranker-reader for open-domain question answering*", in AAAI, Feb. 2-7, 2018.

Wei Yang: "*End-to-end open-domain question answering with BERTserini*", in NAACL Demonstrations, Sep. 18, 2019.

Yair Feldman and Ran El-Yaniv: "*Multi-hop paragraph retrieval for open-domain question answering*", in ACL, Jun. 15, 2019.

Yuwei Fang et al.: "*Hierarchical graph network for multi-hop question answering*", Oct. 6, 2020.

Zhilin Yang et al: "*HotpotQA: A dataset for diverse, explainable multi-hop question answering*", in EMNLP, Sep. 25, 2018.

Zhilin Yang et al: "XLNet: Generalized Autoregressive Pretraining for Language Understanding", arXiv abs/1906.08237, Jan. 2, 2020.

\* cited by examiner

P1: Lit (band)
Lit is an American rock band, formed in 1995 in Fullerton, California

P2: Adorable (band)
Adorable was an alternative rock band, formed in Coventry in 1990

Q: Which band was formed first, Lit or Adorable? A: Adorable

P1: Apratim Majumdar
Apratim Majumdar (born 1978), is an Indian classical musician from Kolkata, India. He play the Sarod.

P2: Sarod
The sarod is a stringed instrument of India, used mainly in Indian classical music.

Q: Which class of instrument does Apratim Majumdar play? A: A stringed instrument

FIG. 1

NEURAL REASONING PATH RETRIEVAL FOR MULTI-HOP TEXT COMPREHENSION

CROSS-REFERENCE TO RELATED APPLICATIONS

This application claims the benefit of European Application No. EP21305037, filed on Jan. 14, 2021. The entire disclosure of the application referenced above is incorporated herein by reference.

FIELD

This disclosure relates to systems and methods for open domain question answering by machine reading.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Open domain question answering leverage deterministic models such as term frequency inverse document frequency (TF-IDF) or bag of words (BM25) can be used to retrieve a predefined fixed set of documents from which a span extractor model identifies the answer to the question posed. However, such approaches employing non-trained retrievers may fail when challenged with multi-hop question answering tasks that require finding several documents as pieces of evidence that often have little lexical overlap or even semantic link to the question.

Other open domain question answering methods may involve end-to-end models to jointly retrieve and read documents. These approaches, however, may fail to answer entity-centric questions because compressing the necessary information into an embedding space may not capture lexical information in entities.

FIG. 1 illustrates example reasoning paths involving entity-based multi-hop reasoning. The first example on the top involves a comparison-type reasoning path, and the second example on the bottom involves a bridge-type reasoning path. In both cases, the relevance of the first sentence and the relevance of the second sentence required for answering the question are not mutually independent for the given question.

This property may question information retrieval techniques that assume independence of the relevance of documents for a given question. The examples of FIG. 1. show that the extraction scheme would benefit from being conditioned by the data source so that the previously retrieved evidence and the data source condition the evidence extraction process for additional evidence. As the examples of FIG. 1 show, estimating the inter-document relevance of each document will provide benefits. Independent retrieval of a fixed list of documents may not capture the necessary relationships between evidence. In particular, bridge entities may involve an approach that includes inter-document relationship estimation.

However, various approaches may not provide for evidence retrieval conditioned on the information available on previously retrieved evidence. For example, some approaches introduce fully general models that retrieve a small subset of candidate documents directly from a dataset (e.g., Wikipedia), but do not involve conditioning evidence documents on the information available on previously selected documents. The assumption of independence of retrieval of evidence from previously retrieved evidence may be due to scalability reasons, but, as exemplified in FIG. 1, this limits quality of retrieval in multi-hop retrieval settings.

Regarding the challenge of entity-centric questions, various approaches may involve guiding retrievers by meta-data and entities, such as by employing hyper-links to connect documents for multi-hop open-domain question answering. Such approaches may try to reduce the search complexity by pruning the reasoning paths to a connected graph. For example, various approaches may add entity links between documents for multi-hop question answering to extend the list of retrieved documents. Such approaches may retrieve evidence documents offline and a TF-IDF-based retriever followed by a reading comprehension model to jointly predict the next next-hop spans to extend the reasoning chain based on the presence of such entities. However, such approaches may rely on a fixed list of documents that are retrieved independently from each other. Similarly, an entity-centric information retrieval approach may use entity linking for multi-hop retrieval. These approaches, however, do not learn to retrieve reasoning paths sequentially.

Other approaches involve iterative retrieval processes. For example, various approaches may involve a multi-step reasoner that repeats the retrieval process for a fixed number of steps, where the model interacts with a trained reading comprehension model by reformulating the question in a latent space. Other approaches involving iterative retrieval processes involve a graph-based recurrent retrieval approach that learns to retrieve reasoning paths over a Wikipedia graph to answer multi-hop open-domain questions.

However, these approaches do not allow for retrieving reasoning paths of arbitrary length because they involve hard-coded termination conditions. Hence, the above approaches and models fail to provide answers to questions when the hard-coded termination condition terminates search before sufficient evidence has been retrieved.

SUMMARY

To address the shortcomings described above, in a feature, the present disclosure relates to neural retrieval systems and methods that learn to select sequences of evidence paragraphs as reasoning paths, sequentially retrieving each evidence paragraph conditioned on the sequence of previously retrieved evidence paragraphs. The retrieval systems and methods hence allow the user to identify, from among a large knowledge base, a minimal set of evidence paragraphs required for answering a question.

In further features, a computer-implemented method for sequential retrieval of reasoning paths relevant for answering a question from a knowledge base is disclosed, where each reasoning path contains a sequence of paragraphs from the knowledge base. The method includes selecting candidate paragraphs from a knowledge base for extending one or more current reasoning paths, where selecting the candidate paragraphs employs a relevance ranking that ranks a lexical relevance of paragraphs from the knowledge base to the question and to paragraphs in the current reasoning paths.

In further features, the method proceeds by determining selection probabilities for extending the one or more current reasoning paths with the candidate paragraphs, where determining the selection probabilities includes constructing extended reasoning paths each including a current reasoning path and a candidate paragraph and employing a neural network scoring model to determine scores for the extended reasoning paths, where the scores indicate the selection probabilities. The method further includes selecting for answering the question one or more of the constructed extended reasoning paths as the one or more current reasoning paths based on the selection probabilities.

In further features, the method may further include estimating an answer likelihood that an extended candidate reasoning path allows inferring an answer to the question.

In further features, selecting the candidate paragraphs, determining the selection probabilities for extending the one or more current reasoning paths with the candidate paragraphs, selecting the one or more extended reasoning paths, and estimating the answer likelihood are repeated until an answer likelihood is above a predetermined threshold likelihood.

In further features, selecting the candidate paragraphs from the knowledge base includes selecting, for each reasoning path in the one or more current reasoning paths, a number of paragraphs from the knowledge base with a highest relevance ranking as respective candidate paragraphs. The extended reasoning paths may be constructed by combining, for each reasoning path in the one or more current reasoning paths, the reasoning path with a paragraph from the respective candidate paragraphs.

In further features, selecting the one or more of the constructed extended reasoning paths as the one or more current reasoning paths comprises pruning the number of extended reasoning paths based on selecting extended reasoning paths with highest combination scores, where a combination score of an extended reasoning path is based on combining the selection probabilities for selecting each paragraph in the extended reasoning path.

In further features, the neural network scoring model employed for scoring the extended reasoning paths includes a multi-head transformer neural network configured for receiving the token representations for the question, the token representations for each paragraph in an extended reasoning path, and a trainable variable. The neural network scoring model may further include a fully connected layer configured to generate the score from the transformed trainable variable outputted by the multi-head transformer neural network.

In further features, the neural network scoring model employed for scoring the extended reasoning paths includes a neural network tokenizer configured to generate token representations for the question and the token representations for each paragraph in an extended reasoning path from corresponding CLS tokens (i.e., tokens representing a sequence starting point).

In further features, the relevance ranking employed for where selecting the candidate paragraphs is based on a bag-of-words representation.

In further features, selecting the extended reasoning paths is based on performing an MCTS (Monte Carlo tree search) search algorithm or on performing a beam search algorithm.

In further features, a computer-implemented method for training a neural network system including a neural network scoring model for evidence retrieval from a knowledge base to answer a question is described. The method includes selecting a set of training questions and, for each training question of the set of training questions, selecting positive evidence paragraphs and negative evidence paragraphs. The method further includes training the neural network scoring model by employing the set of questions and the positive evidence paragraphs and negative evidence paragraphs, where training the neural network scoring model includes minimizing a loss between true reasoning paths and false reasoning paths, where the true reasoning paths are constructed from the set of positive evidence paragraphs, and wherein the false reasoning paths are constructed by randomly selecting paragraphs from the set of positive evidence paragraphs and the set of negative evidence paragraphs.

In further features, the method may further include training an answer inference network for estimating the likelihood that a reasoning path allows inferring an answer to a question. Training the answer inference network includes employing a set of true reasoning paths and a distractor dataset to construct negative examples of reasoning paths by removing evidence paragraphs from the true reasoning paths and adding paragraphs from the distractor dataset.

In further features, the set of negative evidence paragraphs is selected with a token-based retrieval method. For example, the set of negative evidence paragraphs may be selected with a TF-IDF approach, an approached based on BM25, or with a same-document sampling approach.

In further features, an apparatus including one or more processors is disclosed, the one or more processors being configured to perform the disclosed computer-implemented methods.

In further features, one or more computer-readable storage mediums are described, the computer-readable storage medium(s) include computer-executable instructions stored thereon, which, when executed by one or more processors perform ones of the computer-implemented methods described.

In a feature, a question answering system includes: a neural network tokenizer module configured to determine a token representation of a question to be answered and token representations of candidate paragraphs of a present reasoning path for the question, respectively; a neural network module configured to: transform the token representation of the question and the token representations of the candidate paragraphs of the present reasoning path into vector representations; and append a first variable to the vector representations to produce a second variable; a search module configured to: select the candidate paragraphs from a knowledge database to extend a present reasoning path based on lexical relevance of the candidate paragraphs to the question; and selectively add ones of the candidate paragraphs to the present reasoning path, where the neural network module is further configured to determine a score for the present reasoning path based on the second variable; and an answer inference network module configured to selectively determine an answer to the question based on multiple different portions of the present reasoning path when the score of the present reasoning path is greater than a predetermined value.

In further features, the search module is further configured to, when the score of the present reasoning path is less than the predetermined value: select additional candidate paragraphs from the knowledge database to extend the present reasoning path; and selectively add ones of the additional candidate paragraphs to the present reasoning path.

In further features, the neural network module is further configured to: update the second variable based on the additional candidate paragraphs; and update the score after the updating of the second variable.

In further features, the neural network module is a multi-head transformer neural network module that includes at least three layers.

In further features, each of the at least three layers of the multi-head transformer neural network module includes six parallel heads that each include three layers.

In further features, the token representations include CLS tokens.

In further features: the neural network tokenizer module is configured to receive the question from a computing device via a first network; and the answer inference network module is configured to transmit the answer to the question to the computing device via a second network.

In further features, the computing device is configured to at least one of: display the answer to the question on a display; and audibly output the answer to the question via a speaker.

In further features, at least two of the multiple different portions of each include the same word.

In further features, the search module is configured to add only a predetermined number of the candidate paragraphs to the present reasoning path.

In further features, the search module is configured to add only the predetermined number of highest ranking ones of the candidate paragraphs.

In further features, the search module is configured to determine the rankings of the candidate paragraphs based on lexical overlap of the candidate paragraphs with the question.

In further features, the search module is configured to select the candidate paragraphs from the knowledge database via bag of words retrieval.

In further features, the search module is configured to select the candidate paragraphs from the knowledge database via term frequency inverse document frequency (TF-IDF) retrieval.

In further features, the neural network module is configured to determine the score for the present reasoning path based on probabilities of individual paragraphs, respectively, of the present reasoning path including the answer.

In further features, a training module is configured to: select a set of training questions; select positive evidence paragraphs for the training questions, respectively; select negative evidence paragraphs for the training questions, respectively; and train the neural network module based on minimizing a loss between true reasoning paths and false reasoning paths, the true reasoning paths including only positive evidence paragraphs and the false reasoning paths including positive evidence paragraphs and negative evidence paragraphs.

In a feature, a question answering method includes: determining a token representation of a question to be answered and token representations of candidate paragraphs of a present reasoning path for the question, respectively; by a neural network module: transforming the token representation of the question and the token representations of the candidate paragraphs of the present reasoning path into vector representations; and appending a first variable to the vector representations to produce a second variable; selecting the candidate paragraphs from a knowledge database to extend a present reasoning path based on lexical relevance of the candidate paragraphs to the question; selectively add ones of the candidate paragraphs to the present reasoning path; determining a score for the present reasoning path based on the second variable; selectively determining an answer to the question based on multiple different portions of the present reasoning path when the score of the present reasoning path is greater than a predetermined value.

In further features the method further includes, when the score of the present reasoning path is less than the predetermined value: selecting additional candidate paragraphs from the knowledge database to extend the present reasoning path; and selectively adding ones of the additional candidate paragraphs to the present reasoning path.

In further features the method further includes: updating the second variable based on the additional candidate paragraphs; and updating the score after the updating of the second variable.

In a feature, a question answering system includes: a first means (e.g., one or more processors and code) for determining a token representation of a question to be answered and token representations of candidate paragraphs of a present reasoning path for the question, respectively; a second means (e.g., one or more processors and code) for: transforming the token representation of the question and the token representations of the candidate paragraphs of the present reasoning path into vector representations; and appending a first variable to the vector representations to produce a second variable; a third means (e.g., one or more processors and code) for: selecting the candidate paragraphs from a knowledge database to extend a present reasoning path based on lexical relevance of the candidate paragraphs to the question; and selectively adding ones of the candidate paragraphs to the present reasoning path, where the second means is further for determining a score for the present reasoning path based on the second variable; and a fourth means (e.g., one or more processors and code) for selectively determining an answer to the question based on multiple different portions of the present reasoning path when the score of the present reasoning path is greater than a predetermined value.

BRIEF DESCRIPTION OF THE DRAWINGS

The accompanying drawings are incorporated into the specification for the purpose of explaining the principles of the embodiments. The drawings are not to be construed as limiting the invention to only the illustrated and described embodiments or to how they can be made and used. Further features and advantages will become apparent from the following and, more particularly, from the description of the embodiments as illustrated in the accompanying drawings, wherein:

FIG. 1 illustrates example reasoning paths;

DETAILED DESCRIPTION

The present disclosure relates to identifying reasoning paths that correspond to sequences of evidence selected from a large knowledge base (dataset). Herein, evidence includes text paragraphs. In addition to being applied to knowledge retrieval for text, the described systems and methods are also applicable to other environments, such as text-image search.

The present disclosure describes methods and systems for selecting paragraphs $p_1, \ldots, p_k$ from a knowledge base (dataset), such as Wikipedia. Each paragraph includes one or more sentences that include evidence that can be used to answer a question. Retrieving paragraphs specifically leverages structural information in texts in that paragraphs usually contain related information.

Figure 2:
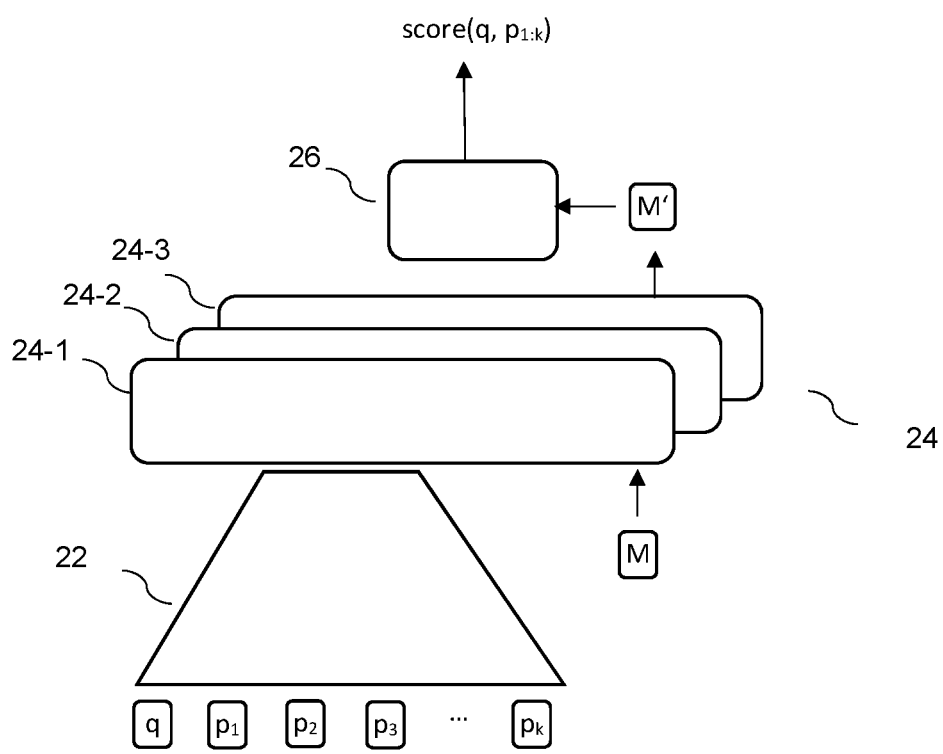
FIG. 2 illustrates a functional block diagram of a neural network scoring model.

FIG. 2 illustrates Transformer-based scoring model (module) 20 of a machine learning system configured to score a candidate reasoning path with respect to a question q. The Transformer based scoring model 20 has a Transformer architecture. The Transformer architecture as used herein is described in Ashish Vaswani, Noam Shazeer, Niki Parmar, Jakob Uszkoreit, Llion Jones, Aidan N Gomez, Łukasz Kaiser, and Illia Polosukhin, "Attention is all you need", In I. Guyon, U. V. Luxburg, S. Bengio, H. Wallach, R. Fergus, S. Vishwanathan, and R. Garnett, editors, Advances in Neural Information Processing Systems 30, pages 5998-6008, Curran Associates, Inc., 2017, (see also arXiv.org publication 1706.03762 v5 and U.S. Pat. No. 10,452,978) which are incorporated herein in their entirety. While one example Transformer architecture is provided, the present application is also applicable to other Transformer architectures.

More generally, attention mechanisms allow for the amplification of relevant signals in a neural network, similar to the way a human is able to intuitively focus on certain parts of an image and know what is important. Self-attention mechanisms are attention mechanisms that relate different positions of a sequence (e.g., determining correlation of words in a sentence). Transformers are one way to implement a self-attention mechanism that maps queries (i.e., the task—e.g., search, translation) against a set of keys (i.e., relevance of the query—e.g., an item title) to present values (i.e., the contents being queried—e.g., best matched item in a database), which together define an embedding matrix. One way transformers compute similarity between queries and keys is using a dot product. Those skilled in the art will appreciate that alternate attention mechanisms may be used for the scoring model 20 described herein with the Transformer architecture to carry out the methods described herein.

Question q and each paragraph of a candidate reasoning path are transformed by neural network tokenizer module 22 to corresponding token representations that are inputted to multi-head transformer neural network module 24. The neural network tokenizer module 22 may include a neural network module pre-trained using an autoregressive pre-training method. The autoregressive pre-training method may include learning bi-directional contexts.

The neural network tokenizer module 22 may be configured to generate a token representation for each paragraph of the candidate reasoning paths from transformed [CLS] tokens (i.e., tokens representing a sequence starting point). The neural network tokenizer module 22 may be configured to process sentences prepended with [CLS] tokens that mark the beginning of the sentence. When processing a paragraph, the neural network tokenizer module 22 may process concatenated sentences of the paragraph, each prepended with a [CLS] token. The token representation for a paragraph may be obtained from the transformed [CLS] token of the last sentence in the paragraph.

The neural network tokenizer module 22 may include an artificial neural network trained using a generalized autoregressive pre-training that enables learning bidirectional contexts by maximizing the expected likelihood over all permutations of the factorization order. The neural network tokenizer module 22 may further include a segment recurrence module and use a predetermined relative encoding scheme. The neural network tokenizer module 22 may implement XLNet, such as described in Zhilin Yang et al: "XLNet: Generalized Autoregressive Pretraining for Language Understanding", arXiv abs/1906.08237, 2019, which is incorporated herein in its entirety. The neural network tokenizer module 22 may thereby contextualize the input sequence while conditioning previously encoded sentences using a memory. Hence, the token representation obtained from the transformed [CLS] token of the last sentence in the paragraph may represent a summary of the paragraph.

The Transformer-based scoring model 20 is configured to provide the token representations for the question followed by token representations for each paragraph of the reasoning path, as determined by the neural network tokenizer module 22, to multi-head transformer neural network module 24. A trainable variable M is appended to the token representations for the question and the paragraphs of the reasoning path by the multi-head transformer neural network module 24.

The multi-head transformer neural network module 24 includes a stack of multi-headed transformer layers 24-1, ..., 24-3 that subsequently transform the input tokens. For illustration, a stack of three multi-headed transformer layers 24-1, ..., 24-3 is displayed in FIG. 2. The multi-head transformer neural network module 24, however, may include another suitable number of multi-headed transformer layers into vector representations of the question and the candidate paragraphs.

Each of the transformer layers 24-1, ..., 24-3 includes a set of 3 linear transformations of dimension $d_k$ of each element of the input sequence, the so-called query value Q, key value K, and value V. Each of the transformer layers 24-1, ..., 24-3 applies a dot attention mechanism according to the following.

$$\text{Attention}(Q, K, V) = \text{softmax}\left(\frac{QK^T}{\sqrt{d_k}}\right)V \quad (1)$$

The multi-head transformer neural network module 24 may be configured as described in Ashish Vaswani et al: "Attention is all you need", in Advances in Neural Information Processing Systems, 2017, which is incorporated herein in its entirety.

After being transformed by the multi-head transformer neural network module 24, the (e.g., position of) trainable variable M is transformed to variable M' by the layer 26. The variable M' may represent a global representation of the sequence of question q and paragraphs $p_1, \ldots, p_k$. This architecture, which uses a dedicated input slot for sequence level scoring, may be similar to the use of the [CLS] token in recent parametric language models to represent a summary of an input sequence in downstream tasks.

An output layer of the multi-head transformer neural network module 24 is processed by fully connected layer 26 to process M'. The output of fully connected layer 26 is employed as a score, score(q, $p_{1:k}$) for question q and candidate reasoning path $p_1, \ldots, p_k$. M' hence serves as a basis for computing score(q, $p_{1:k}$).

In the example of FIG. 2, the multi-head transformer neural network module 24 includes three transformer layers 24-1, 24-2, 24-3 that subsequently process the input sequence of tokens. In various implementations, each of the transformer layers may include six parallel heads that each include three transformer layers. In such implementations, the hidden dimension of each transformer head is 64. Thus, in these implementations, the input to fully connected layer 26 has the dimension 64×6.

Figure 3:
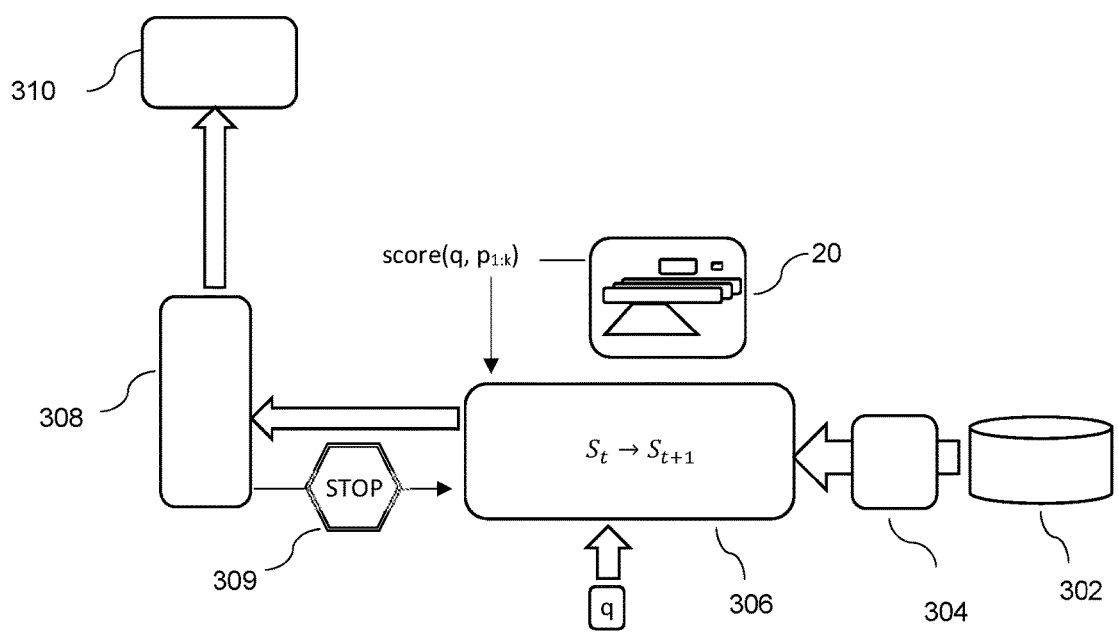
FIG. 3 illustrates a functional block diagram of a machine learning system for evidence retrieval.

FIG. 3 illustrates a functional block diagram of a machine learning system 300 for evidence retrieval from knowledge base (dataset/database) 302 for answering questions, building on the transformer-based scoring model 20 of FIG. 2. The knowledge base 302 may be a large text corpus like the Wikipedia online encyclopedia that contains a multitude of text paragraphs. While an example knowledge base is provided, the present application is also applicable to other knowledge bases.

The machine learning system 300 includes a retriever module 304 that selects candidate sets of paragraphs from the knowledge base 302. The retriever module 304 is configured to receive textual input such as paragraphs and the question text. The retriever module 304 may be configured to select paragraphs from the knowledge base 302 that have a highest relevance ranking for the paragraphs and the question.

The retrieval of paragraphs may be based on a bag-of-words representation, such as by using the BM25 retrieval function, that yields relevance scores employed as relevance ranking. In various implementations, a predetermined number of paragraphs with highest relevance ranking may be retrieved. In various implementations, the predetermined number of paragraphs in the candidate set is between 20 and 50, inclusive, or another suitable number of paragraphs.

Using ranking based on a bag-of-words representation may overcome a problem that fully trainable retrievers based on representations of sentences may perform poorly for entity-centric questions. Performance of fully trainable retrievers with entity-centric questions suffer where distribution and representations do not explicitly maintain lexical information.

The machine learning system 300 further includes a search module 306 configured to search for optimal reasoning paths. The search module 306 is configured to perform sequential search and retrieval in cooperation with the retriever module 304 and the transformer-based scoring model 20. The search module 306 iteratively constructs reasoning path sets over steps t=1, 2, . . . n employing candidate paragraphs retrieved by the retriever module 304.

At t=1, a reasoning path set $S_1$ is initialized. The reasoning path set $S_1$ includes a predetermined number of reasoning paths (i.e., current reasoning paths), where each reasoning path only includes a first paragraph that initializes the reasoning path. To select paragraphs for the reasoning path set $S_1$, the retriever module 304 may retrieve, from the knowledge base 302, a predetermined number of top-ranked paragraphs according to lexical overlap with the question.

At time t, the search module 306 considers a reasoning path set $S_t$ including a number of reasoning paths, where each reasoning path in the reasoning path set $S_t$ is a sequence of t paragraphs that have been selected previously from the knowledge base 302. In step t, the machine learning system 300 retrieves paragraphs from the knowledge base 302 to extend each reasoning path in reasoning path set $S_t$ to thereby construct reasoning path set $S_{(t+1)}$ including reasoning paths of t+1 paragraphs.

A specific reasoning path in the reasoning path set may be the sequence $p_1, p_2, \ldots, p_k$ of paragraphs from the candidate set. The sequential search may include determining, by the search module 306, for each such reasoning path in the current set of reasoning paths, a selection probability $P(p_{k-1}|q, p_1, p_2, \ldots, p_k)$, or $P(p_{k+1}|q, p_{1:k})$ for short, as a probability of selecting a paragraph from the candidate set to extend the reasoning path to a candidate reasoning path. In particular, the selection probability $P(p_{k+1}|q, p_{1:k})$ is conditional on the previously selected paragraphs $p_1, p_2, \ldots, p_k$ of the particular reasoning path. In particular, $P(p_{k+1}|q, p_{1:k}) \neq P(p_{k+1}|q)$, which reflects fact that paragraphs providing evidence for answering the question q do not necessarily have lexical overlap with the question. When questions must be answered with multiple hops, paragraph $p_{k+1}$ may become relevant only in the context of the previously selected $p_{1:k}$.

For each reasoning path $p_1, p_2, \ldots, p_k$ from the current set of reasoning paths, the search module 306 may determine the selection probability $P(p_{k+1}|q, p_{1:k})$ of selecting a particular $p_{k+1}$ from the candidate set by inputting the candidate reasoning path $p_1, p_2, \ldots, p_k, p_{k+1}$ to the transformer-based scoring model 20 which outputs score(q, $p_{1:k+1}$). This score is used by the search module 306 as an estimate of the selection probability $P(p_{k+1}|q, p_{1:k})$.

The search module 306 may determine, based on the selection probability $P(p_{k+1}|q, p_{1:k})$, whether candidate reasoning path $p_1, p_2, \ldots, p_k, p_{k+1}$ should be included in the reasoning path set.

In more detail, the number of reasoning paths in the reasoning path set may be a predetermined beam size. To limit the search tree, the search module 306 may be configured to, for each reasoning path in the reasoning path set, select a predetermined number of paragraphs $p_{k+1}$ with largest selection probabilities $P(p_{k+1}|q, p_{1:k})$ to extend the reasoning path. The number of selected paragraphs may correspond to the predetermined beam size. For the resulting reasoning paths of length k+1, a total score may be determined, and the number of the resulting reasoning paths of length k+1 may be pruned down to the predetermined beam size by removing reasoning paths with low total scores (e.g., the lowest total scores).

The search module 306 may determine a total score for each reasoning path $E=[p_i, \ldots, p_k]$ by multiplying the probabilities of selecting each paragraph as $$\text{score}_{total}(E) = P(p_1|q)P(p_2|q,p_1) \ldots P(p_k|q,p_{1:k-1}) \qquad (2)$$

Accordingly, in various implementations, the sequential search performed by the search module 306 is a beam search. In other embodiments, the sequential search performed by the search module 306 is a Monte Carlo tree search (MCTS) algorithm.

The search module 306 may output a predetermined number of top reasoning paths with highest combined scores.

Hence, the machine learning system 300 may use a double indexation: one provided by the neural network tokenizer module 22 and one provided by the retriever module 304. This may enable maintaining an efficient matching property of the named entities. In particular, the sequential selection process, as explained above, is supported by a contextualized representation of the sentence which allows the system to cope with the lack of lexical overlap between paragraphs necessary to answer multi-hop questions.

The machine learning system 300 further includes an answer inference network module 308 that is configured to receive a current (present) top-ranked reasoning path from the search module 306. The answer inference network module 308 is configured to determine a likelihood that the received candidate reasoning path includes an answer to the question. When a determined likelihood that the paragraphs selected in the received candidate reasoning path allow inferring an answer to the question is greater than a predetermined value (e.g., 80%), the answer inference network module 308 outputs a stop signal 309 to the search module 306 so that the sequential search is terminated and the current top-ranked candidate reasoning paths are output at block 310. The search module 306 stops the sequential search in response to the stop signal 309. In particular embodiments, the answer inference network module 308 may implement a fine-tuned BertQA model.

This selection procedure performed by the search module 306 allows capturing reasoning paths and not only independent paragraphs. Furthermore, the reasoning paths may be of arbitrary length (e.g., have a predetermined length).

The answer inference network module 308 may further be configured to determine and output an answer to the question at block 310 by extracting and combining information contained in the paragraphs of the reasoning path set. The answer inference network module 308 may be configured to hop from one piece of information in the reasoning path set to another piece of information in the reasoning path set, for example, based on the pieces of information being the same word. This may be referred to as multi-hop question answering. Examples of multi-hop question answering are illustrated in FIG. 1.

In various implementations, the answer inference network module 308 may include a BertQA model and a fully connected layer, where the fully connected layer is configured to receive the transformed [CLS] token of a reasoning path. The transformed [CLS] token represents a summary of the reasoning path. The fully connected layer may be configured to compute the likelihood that the candidate reasoning path allows inferring an answer to the question from the transformed [CLS] token. The BertQA model is described in Ankit Chadha and Rewa Sood, *BERTQA—Attention on Steroids*, arXiv:1912.10435, which is incorporated by reference in its entirety.

In various implementations, the system 300 may receive the question from a computing device (e.g., a cellular phone, tablet, personal assistant device, etc.) via a network, such as the Internet. The question may be in the form of text, voice, handwriting, or have another suitable form. In the example of non-text, the system 300 may perform a conversion to text and determine the question from the text. In the example of text, the system 300 may determine the question from the text. When the answer is determined, the system 300 may transmit the answer to the computing device from which the question was received via a network, such as the Internet. The computing device is configured to at least one of: display the answer on a display (e.g., of the computing device); and audibly output the answer via a speaker (e.g., of the computing device).

Figure 4:
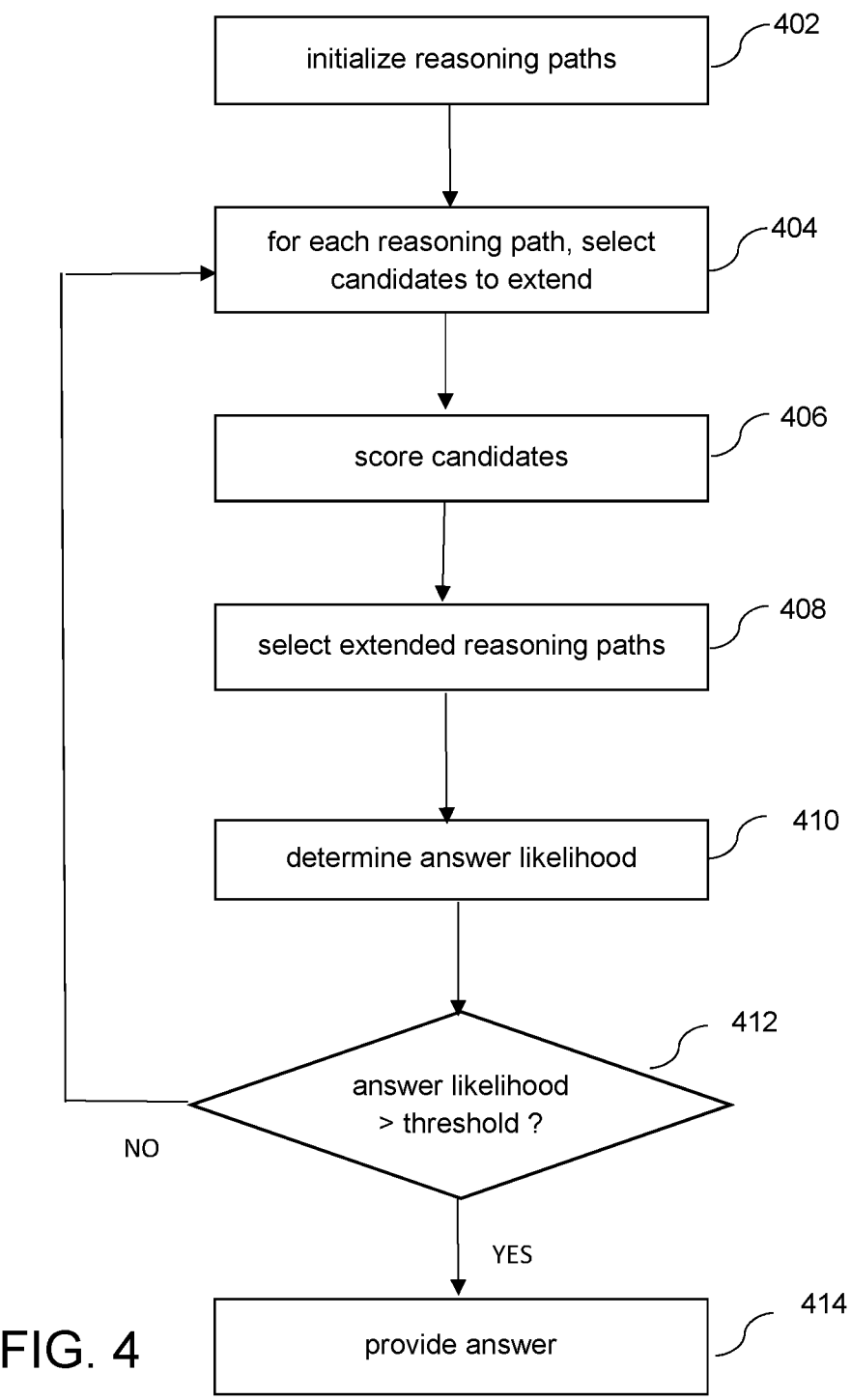
FIG. 4 illustrates a process flow diagram of a method for evidence retrieval.

FIG. 4 is a flowchart depicting an example method 400 of using a machine learning system for paragraph retrieval from a knowledge base and answering a question.

Reasoning paths considered in the method 400 may form a reasoning path set of a predetermined size (e.g., length), where the length of reasoning paths in the reasoning path set is iteratively increased. While the system 300 will be referred to as performing the following functions, individual components may perform the respective functions as described above.

At 402 the system 300 initializes reasoning paths by initializing each reasoning path included in the reasoning path set with top-ranked paragraphs retrieved from the knowledge base. The ranks (or rankings) of paragraphs, respectively, are determined (e.g., by the search module 306) based on lexical overlap of the paragraphs with the question.

At 404 to 412, the system 300 iteratively retrieves and scores paragraphs from the knowledge base to extend each reasoning path in the reasoning path set until the system 300 determines that a reasoning path in the reasoning path set includes sufficient information to answer the question.

The method 400 includes, for each reasoning path in the reasoning path set, at 404 the system 300 retrieves a corresponding candidate set of paragraphs for extending the reasoning paths. The system 300 (e.g., the search module 306) may determine the score for a reasoning path based on calculating a lexical overlap between paragraphs from the knowledge base and the reasoning path. For example, at 404 the system 300 may retrieve the candidate set using BM25 retrieval. In various implementations, for each reasoning path, a predetermined number of top-scored candidate paragraphs from the knowledge base may be retrieved.

At 406 the system 300 determines, for each reasoning path in the reasoning path set, a selection probability of selecting a candidate reasoning paths from the corresponding candidate set for extending the reasoning path. Each candidate reasoning path includes the paragraphs from the reasoning path followed by one of the candidate paragraphs retrieved at 404 for the respective reasoning path. The selection probability may be estimated from a score of the candidate reasoning path as determined by the transformer-based scoring model 20 as discussed above.

At 408, the system may prune the reasoning path set (e.g., remove entries from the reasoning path set) and decrease the reasoning path set to a predetermined number of reasoning paths. The pruning may be based on calculating total scores $score_{total}$ for reasoning paths and removing reasoning paths having the lowest scores. For a reasoning path $E=[s_i, \ldots, s_k]$ a total score may be calculated by the system 300 (e.g., the search module 306) according to Equation (2). Described another way, the pruning at 408 may include selecting only a predetermined number of reasoning paths with highest $score_{total}$ and including only the selected reasoning paths in the reasoning path set.

At 410 the system 300 may determine a likelihood that one of the reasoning paths in the reasoning path set (present reasoning path) allows an answer to the question to be inferred (e.g., whether the score is greater than a predetermined value).

If it is determined at 412 that for all of the reasoning paths in the current reasoning path set the likelihood that the reasoning path allows inferring an answer to the question is below the predetermined value, the method 400 repeats 404 to 412 and extends each reasoning path in the set of reasoning paths by another paragraph retrieved from the candidate set of paragraphs.

If it is determined at 412 that, for a particular reasoning path from the set of reasoning paths, the likelihood that the particular reasoning path allows inferring an answer to the question is greater than the predetermined value, the method 400 continues with 414 of outputting the reasoning path likely to allow inferring an answer and/or a determined answer. In this manner, the method 400 may considerably improve information retrieval for identification of information that allows answering a question. At 414, the system 300 transmits the answer to the question to the computing device from which the question was received.

Figure 5:
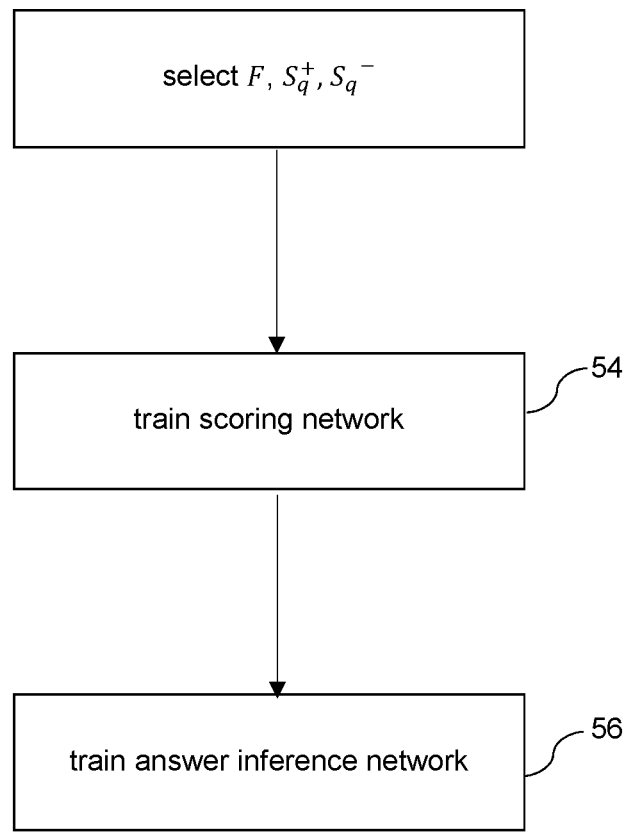
FIG. 5 illustrates a process flow diagram of a method of training a machine learning system for evidence retrieval.
Figure 7:
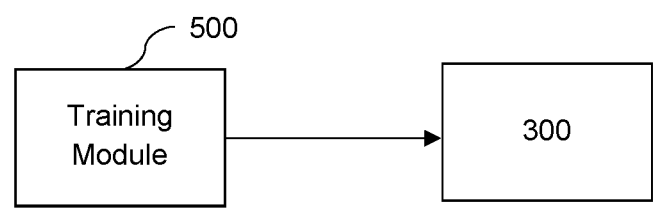
FIG. 7 is a functional block diagram of a training system.

FIG. 5 includes a flowchart depicting an example method 50 of training a machine learning system for information retrieval from a knowledge base to answer questions, such as the system 300 described above. FIG. 7 is a functional block diagram of a training system.

Referring to FIGS. 5 and 7, at 52 (FIG. 5), a training module 500 (FIG. 7) selects a set of training questions F, positive evidence set $S_q^+$, and negative evidence set $S_q^-$ from a training dataset. Positive evidence set $S_q^+$ is a set of positive evidence paragraphs $p_i^+$ that include information useful to answering training question $q \in F$, so that a true reasoning path may be constructed as a sequence of paragraphs $p_i^+$. Negative evidence set $S_q^-$ is a set of negative evidence paragraphs $p_i^-$ that contain information unrelated to question q. Selection of negative evidence paragraphs $S_q^-$ may be based on employing TF-IDF scores or on a same document sampling approach, or on another token-based retrieval method.

The method 50 further includes, at 54, of training a transformer-based scoring model 20 for scoring candidate reasoning paths from respective token representations of each paragraph as described above. The transformer-based scoring model 20 is trained to sequentially discriminate between relevant and irrelevant candidate evidence paragraphs by employing a pair-wise loss scheme, such as $$L(\theta) = \sum_{q \in F} \sum_{s^+ \in S_q^+} \sum_{s^- \in S_q^-} \max \quad (3)$$
$$[0, f_\theta(q, p_1^+, \ldots, p_k^+) - f_\theta(q, p_1^{\{-,+\}}, \ldots, p_k^{\{-,+\}}) + \mu]$$

where µ is a margin term and L is the loss. The function $f_\theta$ corresponds to the transformations of multi-head transformer neural network module 24. Training includes selecting $p_1^{\{-,+\}}$ randomly from either $S_q^+$ or $S_q^-$. The loss according to Eq. (3) corresponds to a pair-wise loss scheme contrasting consistent or true reasoning paths with inconsistent or false reasoning paths which include irrelevant or disjoint information.

The method 50 further includes, at 56, of training the answer inference network module 308 to estimate a likelihood that a current set of evidence paragraphs allow inferring/determining an answer to a question. At 56, regarding stopping criteria, a set of questions and sets of true reasoning paths of equal length k may be used. During training, considered reasoning paths share the same number k of evidence paragraphs with k≤n, where n is the number of true evidence paragraphs for the given question. Because the decoding process as performed by the search module 306 described above scores candidate sequences of equal number of evidence paragraphs, this restriction to reasoning paths with the same number k of evidence paragraphs is in accordance with the use of the machine learning system.

Training the answer inference network module 308 may include using a distractor setting, such as provided by HotpotQA distractors. Negative examples may be produced by suppressing evidence sentences and adding distractor sentences to ground truth reasoning paths. The stopping criteria may be based on a BertQA model as described above, where a fully connected layer is appended that receives the transformed [CLS] representation of the sequence that represents a summary of the sentence. The output of the fully connected layer may compute the probability that the given reasoning path can infer/determine an answer to the question. Training the answer inference network module 308 may be based on minimizing a binary cross-entropy loss of the output of the fully connected layer. In various implementations, the answer inference network module 308 may use a threshold (predetermined value) of 0.75 (e.g., at test time and in use) to stop the retrieving process by the search module 306.

Figure 6:
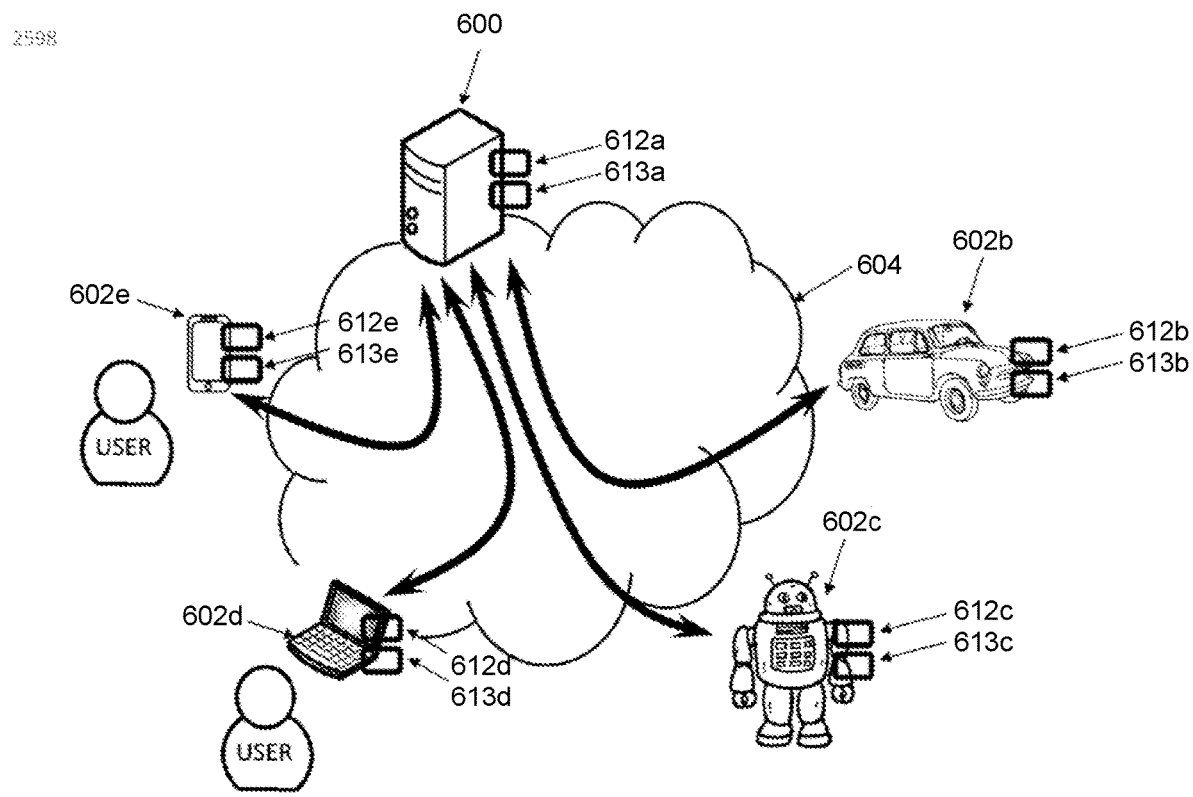
FIG. 6 illustrates an example architecture in which the disclosed methods and systems may be implemented.

The above-mentioned systems, methods, and implementations may be implemented within an architecture such as that illustrated in FIG. 6, which includes a server 600 and one or more computing devices 602 that communicate over a network 604 (which may be wireless, wired, or a combination of wired and wireless), such as the Internet, for data exchange.

The server 600 and the computing devices 602 each include a data processor 612 and memory 613, such as a hard disk. The computing devices 602 may be any type of computing devices that communicate with the server 600, such as an autonomous vehicle 602b, a robot 602b, a computer 602d, a cell phone 602e, or another type of computing device. The machine learning system 300 of FIGS. 2 and 3 may be implemented within the server 600. The training module 500 may also be implemented within the server 600 or separately.

The server 600 may receive a question from a computing device 602 and use processor 612a and the trained machine learning system 300 to determine an answer to the question. More specifically, the server 600 may determine a reasoning path likely containing evidence to answer the question as described above, such as in conjunction with FIG. 4. The server 600 may provide one or more most likely reasoning paths to the client device 602 that submitted the question. While the example of one processor is provided, Some or all of the method steps described above may be implemented by a computer in that they are executed by (or using) a processor, a microprocessor, an electronic circuit or processing circuitry. The embodiments described above may be implemented in hardware or a combination of hardware and software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a special-purpose computer system.

Generally, embodiments can be implemented as computer program products with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor.
Evaluation The disclosed machine learning system has been evaluated for a supporting fact identification task, employing the hotpot QA dataset that provides a dataset for explicit supporting fact identification. Each question in this dataset is tagged with one of two question types, the bridge type or the comparison type, characterizing the necessary reasoning scheme for answering. In the evaluation, the disclosed systems been configured with six parallel transformer heads which each include three transformer layers. The hidden dimension of each transformer head has been set to 64.

A pre-trained XLNet model has been employed as the neural network tokenizer module 22 to compute the token representation of sentences and questions, while BM25 has been employed for implementing the retriever module 304. The machine learning system has been optimized with an Adams optimizer and an initial learning rate of $10^5$. All parameters have been defined through cross-validation. The input to the fully connected hidden dimension is hence 64×6.

The disclosed machine learning system has been evaluated for supporting fact prediction for both of the two question types compared with three other models, hierarchical graph network followed by a Semantic Retrieval, cognitive graph, and Semantic Retrieval, and a baseline.

The models are evaluated by the scores in Exact Match (EM) and F1 score for the two tasks.

TABLE 1

| Models | F1 | EM |
| --- | --- | --- |
| Disclosed system | 77.1 | 51.7 |
| HGN + SemanticRetrievalMRS-IR (Fang et al) | 76.39 | 49.97 |
| Cognitive Graph (Ming Ding et al) | 70.83 | 38.67 |
| Semantic Retrieval (Yixin Nie et al) | 57.69 | 22.82 |
| Baseline (Zhilin Yang et al) | 37.71 | 3.86 |

Table 1 shows that in both F1 score and EM, the disclosed system perform better on the distractor and full Wikipedia settings of HotpotQA.

In this disclosure a novel transformer-based reasoning path retrieval approach has been described which retrieves sequences of evidence paragraphs from a knowledge base, such as Wikipedia. To answer multi-hop open domain questions, a search module learns to sequentially retrieve—given the history of previously retrieved evidence paragraphs—further evidence paragraphs to form a reasoning path. An answer inference network module learns to determine a likelihood of an answer being present in a candidate set of evidence paragraphs of a reasoning path.

The approach of sequentially retrieving evidence paragraphs given the previously retrieved evidence paragraphs is a step towards more efficient information retrieval systems and better knowledge accessibility.

In addition to improving performance as corroborated in Table 1, the described systems and methods provide insight into underlying entity relationships and the provided discrete reasoning paths are helpful in human interpretation of the reasoning process, thereby improving on the issue of explainability of machine learning systems. The disclosed systems and methods have been described for multi-hop question answering. However, the present application is also applicable to multi-hop evidence retrieval for fact-checking and other applications.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A question answering system comprising:
a neural network tokenizer module configured to determine a token representation of a question to be answered and token representations of candidate paragraphs of a present reasoning path for the question, respectively;
a neural network module configured to:
transform the token representation of the question and the token representations of the candidate paragraphs of the present reasoning path into vector representations; and
append a first variable to the vector representations to produce a second variable;
a search module configured to:
select the candidate paragraphs from a knowledge database to extend a present reasoning path based on lexical relevance of the candidate paragraphs to the question; and
selectively add ones of the candidate paragraphs to the present reasoning path,
wherein the neural network module is further configured to determine a score for the present reasoning path based on the second variable; and
an answer inference network module configured to selectively determine an answer to the question based on multiple different portions of the present reasoning path when the score of the present reasoning path is greater than a predetermined value.

2. The system of claim 1 wherein the search module is further configured to, when the score of the present reasoning path is less than the predetermined value:
select additional candidate paragraphs from the knowledge database to extend the present reasoning path; and
selectively add ones of the additional candidate paragraphs to the present reasoning path.

3. The system of claim 2 wherein the neural network module is further configured to:
update the second variable based on the additional candidate paragraphs; and
update the score after the updating of the second variable.

4. The system of claim 1 wherein the neural network module is a multi-head transformer neural network module that includes at least three layers.

5. The system of claim 4 wherein each of the at least three layers of the multi-head transformer neural network module includes six parallel heads that each include three layers.

6. The system of claim 1 wherein the token representations include CLS tokens.

7. The system of claim 1 wherein:
the neural network tokenizer module is configured to receive the question from a computing device via a first network; and
the answer inference network module is configured to transmit the answer to the question to the computing device via a second network.

8. The system of claim 7 further comprising the computing device; wherein the computing device is configured to at least one of:
display the answer to the question on a display; and
audibly output the answer to the question via a speaker.

9. The system of claim 1 wherein at least two of the multiple different portions of each include the same word.

10. The system of claim 1 wherein the search module is configured to add only a predetermined number of the candidate paragraphs to the present reasoning path.

11. The system of claim 10 wherein the search module is configured to add only the predetermined number of highest ranking ones of the candidate paragraphs.

12. The system of claim 10 wherein the search module is configured to determine the rankings of the candidate paragraphs based on lexical overlap of the candidate paragraphs with the question.

13. The system of claim 1 wherein the search module is configured to select the candidate paragraphs from the knowledge database via bag of words retrieval.

14. The system of claim 1 wherein the search module is configured to select the candidate paragraphs from the knowledge database via term frequency inverse document frequency (TF-IDF) retrieval.

15. The system of claim 1 wherein the neural network module is configured to determine the score for the present reasoning path based on probabilities of individual paragraphs, respectively, of the present reasoning path including the answer.

16. A training system comprising:
the system of claim 1; and
a training module configured to:
  select a set of training questions;
  select positive evidence paragraphs for the training questions, respectively;
  select negative evidence paragraphs for the training questions, respectively; and
  train the neural network module based on minimizing a loss between true reasoning paths and false reasoning paths, the true reasoning paths including only positive evidence paragraphs and the false reasoning paths including positive evidence paragraphs and negative evidence paragraphs.

17. A question answering method comprising:
determining a token representation of a question to be answered and token representations of candidate paragraphs of a present reasoning path for the question, respectively;
by a neural network module:
  transforming the token representation of the question and the token representations of the candidate paragraphs of the present reasoning path into vector representations; and
  appending a first variable to the vector representations to produce a second variable;
selecting the candidate paragraphs from a knowledge database to extend a present reasoning path based on lexical relevance of the candidate paragraphs to the question;
selectively add ones of the candidate paragraphs to the present reasoning path;
determining a score for the present reasoning path based on the second variable; and
selectively determining an answer to the question based on multiple different portions of the present reasoning path when the score of the present reasoning path is greater than a predetermined value.

18. The method of claim 17 further comprising, when the score of the present reasoning path is less than the predetermined value:
selecting additional candidate paragraphs from the knowledge database to extend the present reasoning path; and
selectively adding ones of the additional candidate paragraphs to the present reasoning path.

19. The method of claim 18 further comprising:
updating the second variable based on the additional candidate paragraphs; and
updating the score after the updating of the second variable.

20. A question answering system comprising:
a first means for determining a token representation of a question to be answered and token representations of candidate paragraphs of a present reasoning path for the question, respectively;
a second means for:
  transforming the token representation of the question and the token representations of the candidate paragraphs of the present reasoning path into vector representations; and
  appending a first variable to the vector representations to produce a second variable;
a third means for:
  selecting the candidate paragraphs from a knowledge database to extend a present reasoning path based on lexical relevance of the candidate paragraphs to the question; and
  selectively adding ones of the candidate paragraphs to the present reasoning path,
wherein the second means is further for determining a score for the present reasoning path based on the second variable; and
a fourth means for selectively determining an answer to the question based on multiple different portions of the present reasoning path when the score of the present reasoning path is greater than a predetermined value.

21. A question answering system comprising:
a search module configured to select candidate paragraphs from a knowledge database to extend a present reasoning path for answering a question, wherein the search module is configured to select the candidate paragraphs based on lexical relevance of the candidate paragraphs to the question and based on lexical relevance of the candidate paragraphs to paragraphs of the present reasoning path;
a neural network tokenizer module configured to determine a token representation of the question, token representations of the paragraphs of the present reasoning path, and token representations of the candidate paragraphs, respectively;
a neural network module configured to:
  transform the token representation of the question, the token representations of the paragraphs of the present reasoning path, and the token representations of the candidate paragraphs into vector representations;
  append a first variable to the vector representations to produce a second variable; and
  determine a score for the present reasoning path based on the second variable; and
an answer inference network module configured to determine a likelihood that the present reasoning path allows inferring an answer to the question and to selectively determine the answer to the question based on multiple different portions of the present reasoning path when the determined likelihood is greater than a predetermined value,
wherein the search module is further configured to selectively add ones of the candidate paragraphs to the present reasoning path based on optimizing the score.

22. A question answering method comprising:
selecting candidate paragraphs from a knowledge database to extend a present reasoning path for answering a question, wherein selecting the candidate paragraphs is based on lexical relevance of the candidate paragraphs to the question and based on lexical relevance of the candidate paragraphs to paragraphs of the present reasoning path;
determining a token representation of the question, token representations of the paragraphs of the present reasoning path, and token representations of candidate paragraphs for extending the present reasoning path, respectively;
transforming, by a neural network module, the token representation of the question, the token representations of the paragraphs of the present reasoning path, and the token representations of the candidate paragraphs into vector representations; and
appending, by the neural network module, a first variable to the vector representations to produce a second variable;

determining, by the neural network module, a score for the present reasoning path based on the second variable;

selectively add ones of the candidate paragraphs to the present reasoning path, wherein selectively adding ones of the candidate paragraphs to the present reasoning path is based on optimizing the score;

determining a likelihood that the present reasoning path allows inferring an answer to the question; and selectively determining an answer to the question based on multiple different portions of the present reasoning path when the determined likelihood is greater than a predetermined value.

* * * * *